(12) United States Patent  
Crabb

(10) Patent No.: US 6,977,611 B1  
(45) Date of Patent: Dec. 20, 2005

(54) FM-CW ALTIMETER DETECTOR

(75) Inventor: Ronald T. Crabb, Severna Park, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 1826 days.

(21) Appl. No.: 06/707,611

(22) Filed: Mar. 4, 1985

(51) Int. Cl.⁷ ............................................. G01S 13/08
(52) U.S. Cl. .................................................. 342/122
(58) Field of Search ........................ 343/18 E, 14, 17.5, 343/12 A; 455/205; 342/122

(56) References Cited

U.S. PATENT DOCUMENTS

| | | |
|---|---|---|
| 3,500,401 A | 3/1970 | Miller et al. ............... 343/18 E |
| 3,713,153 A | 1/1973 | Van Popta ................... 343/7.7 |
| 3,758,856 A | 9/1973 | Fromm ...................... 343/18 E |
| 3,868,685 A | 2/1975 | Wilmot ..................... 343/50 P |
| 3,870,996 A | 3/1975 | Miller ...................... 343/18 E |
| 3,894,219 A | 7/1975 | Weigel ..................... 343/50 P |
| 3,896,442 A | 7/1975 | Heminway et al. ........ 343/18 E |
| 3,987,285 A | 10/1976 | Perry ................... 343/17.2 PC |
| 4,016,565 A | 4/1977 | Walker ..................... 343/12 A |
| 4,017,859 A | 4/1977 | Medwin ............... 343/100 CL |
| 4,173,760 A | 11/1979 | Garrison ..................... 343/15 |
| 4,236,159 A | 11/1980 | Alpers .................... 343/113 R |
| 4,270,180 A | 5/1981 | Charlton .................... 364/728 |
| 4,297,702 A | 10/1981 | Carnes ...................... 343/7 PF |
| 4,355,368 A | 10/1982 | Zeidler et al. .............. 364/728 |
| 4,398,196 A | 8/1983 | Wiegand ............... 343/17.1 R |

*Primary Examiner*—Mark Hellner

(57) ABSTRACT

A receiver for detecting the presence of FM-CW signals emanating from a radio altimeter, and for determining the identity of the source. The received signals are amplified and applied both directly and through a delay circuit to a mixer. The delay is such that the resulting difference signal from the mixer is a low frequency signal in the audio frequency range. This signal is filtered, converted to digital values, and processed by fast Fourier transform techniques. Once processed, the spectral content of the difference signal is analyzed to determine if the signal originated from an airborne altimeter. Characteristics of the original signal modulation are also analyzed to ascertain the identity of the altimeter and its transporting aircraft.

14 Claims, 1 Drawing Sheet

FM-CW ALTIMETER DETECTOR

BACKGROUND OF THE INVENTION

This invention relates, in general, to electronic communication devices and, more specifically, to devices for detecting the presence of specialized electromagnetic signals.

Many aircraft and airborne weapon systems fly at relatively low altitudes and carry special instruments or devices for determining or measuring the distance between the flying object and the ground. Radio altimeters are frequently used for such purposes, with one of the most popular types using FM-CW (frequency modulated-continuous wave) techniques. In such altimeters, the transmitted wave from the airborne device consists of a continuous or non-pulsed signal modulated to shift the instantaneous frequency in predetermined amounts and directions.

In military applications, it is desirable to detect or know when an aircraft or missile is approaching. In many instances, this can be accomplished by conventional radar systems which use reflected signals from the airborne object produced by illuminating transmissions from a remote source. Although useful in many situations, conventional radar has certain limitations, especially with low flying aircraft.

Detection of airborne objects containing radio altimeters is sometimes more reliable or desirable than using conventional radar systems. Generally speaking, the detection is accomplished by monitoring for the presence of radio or electromagnetic signals from the altimeter device. Although successful altimeter detectors have been used, their accuracy and efficiency is not as good as desired in certain situations.

According to prior art arrangements, detection of altimeter signals is somewhat difficult due to the fact that the transmitter used by the altimeter has a relatively low power output. Values from one-half to one watt are typical. In addition, the transmitted energy reaching the detection device is leaving the altimeter antenna at a very low sidelobe of the antenna pattern. Therefore, little or no antenna gain is realized to increase the effective power received by the detecting device. Also, the propagation of the sidelobe signals in the direction of the detecting device is further attenuated by the aircraft fuselage along which the signal must travel to be directed ahead of the moving aircraft. Estimates of this sidelobe attenuation vary, but best information available places the attenuation such that antenna sidelobe gain is between −5 and −15 dbi. Another factor which makes detecting altimeter signals difficult is the fact that typical altimeters are modulated over several tens of megahertz. This makes it difficult to use conventional narrow band receiving and detecting techniques which offer better signal-to-noise detection capabilities.

For all of these reasons, detection has usually been limited to short ranges. Normal practice according to the prior art has been to use either narrow filters or compressive receivers for altimeter detection. The narrow filter arrangement senses only a small spectral portion of the transmitted energy and is rather limited in its ability to detect and, as is usually desirable, identify the source of altimeter signal as to, for example, friend or foe.. Therefore, it is desirable, and it is an object of this invention, to provide a reliable and efficient altimeter detector which affords long range detection capabilities along with the ability to look closely at the altimeter originated signal to determine the identification of the signal source.

Prior art considered pertinent to this invention is described in two U.S. patents. U.S. Pat. No. 3,296,581, issued on Jan. 3, 1967, teaches a detection technique whereby the input signal is applied to a coincidence detector both directly and through a delay line. The signal is first limited, differentiated, and clipped before being applied to the delay line which has a precise time period of one wave length. The coincidence detector produces an output only upon coincidence of its two input signals. As will be described later in more detail, the current invention does not require limiting, differentiating, or clipping the signals before application to the delay line, the delay of the delay line is much longer than one RF wave length and not fixed at that value, and the direct and delayed signals are applied to a mixer, or difference circuit, not to a coincidence detector.

U.S. Pat. 4,225,954, issued on Sep. 30, 1980, teaches a system which uses an auto correlation process to calculate delay times for various signals received by the system. The similarity of this patent with the present invention exist because both use fast Fourier transform processing, auto correlation, and analog-to-digital conversion to process an incoming signal. However, distinct differences exist which distinguish the present invention over this patent in addition to the fact that the patent pertains to audio signals whereas the present invention pertains to microwave frequency signals. In the referenced patent, the auto correlation is applied to a digital signal and produces digital values corresponding to time differences. The auto correlation process does not produce the signal to be processed by fast Fourier transform techniques as in the present invention, but produces variable quantities which are further processed with the results of the fast Fourier transform processing to produce a corrected frequency domain signal. As will be described in more detail herein, the present invention uses some of the same components as the referenced patent but for different reasons and at different steps in the processing technique.

Several prior art arrangements exist that teach the use of radar receivers which use delay lines in the signal processing system. The major difference between all of these prior art arrangements and the present invention is that the prior art arrangements use local oscillators which mix with the input signal to provide an IF signal. The present invention does not use a local oscillator but instead uses a delayed replica of the input signal to form the mixer injection frequency. The advantages of this technique are discussed in the detailed description of the present invention.

SUMMARY OF THE INVENTION

There is disclosed herein a new and useful device for detecting the presence of a signal emanating from an airborne radio altimeter. The detector is useful for recognizing the presence of FM-CW signals operating with different and/or variable modulation waveforms. By looking at characteristics of the transmitted waveform, which is preserved in the detection process, identification of the altimeter system and hence the supporting vehicle is possible.

The FM-CW signal from the altimeter is received by an antenna and amplified by a low noise amplifier. The amplified signal is applied directly to a mixer stage and indirectly to the mixer through a delay circuit. The amount of delay is such that the difference signal from the mixer is in or near the audio spectrum and is passed on to other circuitry by a low pass filter. Once filtered, the low frequency analog signal is converted to digital values and processed by spectrum analysis techniques, such as fast Fourier transform processing. The information from the spectrum analyzing process is further processed by suitable circuitry, such as a digital computer, to determine if the difference signal is characteristic of an altimeter signal. Further processing of waveform type, slope and period can be performed to determine the type of altimeter and/or aircraft.

This altimeter detecting arrangement permits detection of FM-CW altimeter signals by using narrow band filtering of the IF signal to obtain good signal-to-noise performance. Because of the specific arrangement of the narrow filter and other components of the system, modulation information is preserved and analyzing the modulation forms is possible.

BRIEF DESCRIPTION OF THE DRAWINGS

Further advantages and uses of this invention will become more apparent when considered in view of the following detailed description and drawing, in which.

DESCRIPTION OF THE PREFERRED EMBODIMENTS

Figure 1:
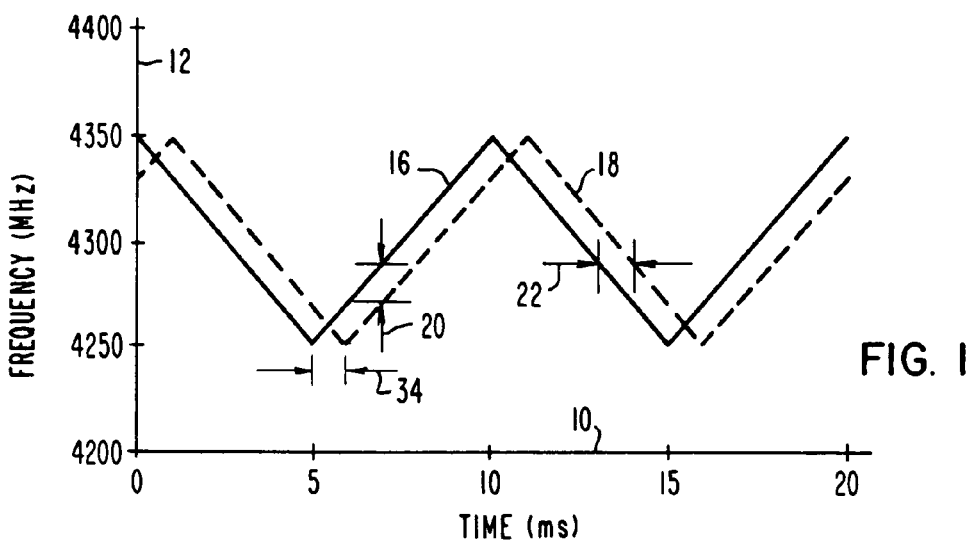
FIG. 1 is a graph illustrating typical FM-CW waveforms for originated and delayed signals.

Throughout the following description, similar reference characters refer to similar elements or members in all of the figures of the drawing.

Referring now to the drawing, and to FIG. 1 in particular, there is shown a graph of FM-CW altimeter waveforms. Axis 10 corresponds to time whereas axis 12 corresponds to the signal frequency. The units on the axes 10 and 12 are characteristic of those encountered in typical FM-CW altimeter systems.

Curve 16 represents the frequency of the signal radiated by the altimeter for the purpose of receiving echoes reflected from the ground. Curve 18 represents a typical echo returned to the altimeter from the ground. Due to the propagation time, curve 18 is delayed in time from curve 16, and it is this time differential that the altimeter measures to determine altitude. Calculations can show that for each foot of height above ground a delay of approximately two nanoseconds will be produced. Curve 16 represents an FM-CW signal with a deviation of plus or minus 50 megahertz and a modulating frequency of 100 hertz.

A cross correlation process may be used in the altimeter to detect the frequency difference 20 between the originated and the reflected signals. The difference frequency is proportional to the delay 22, thus the altitude can be determined from the cross correlation process in the altimeter receiver. The delay 22 is shown longer than typically encountered for clarity of the figure.

This unique ability of frequency modulated CW signals to allow for measurement of delay by detecting the frequency difference is used by the invention disclosed herein. However, an auto correlation process is used in the detector disclosed herein since cross correlation cannot be accomplished without a strong reference signal being available directly from the transmitter. In addition, the delay according to this invention is fixed and provided by circuitry at the receiver location rather than by the propagation of the signals through the atmosphere between the altimeter and ground.

Figure 2:
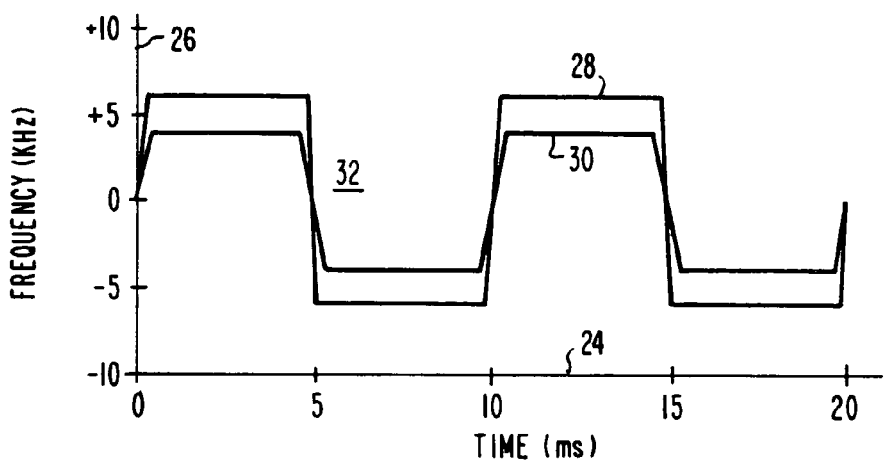
FIG. 2 is a graph illustrating difference signals produced by mixing original and delayed FM-CW signals.

FIG. 2 is a graph illustrating typical difference or IF signals produced by the detector of this invention. Axis 24 corresponds to time and axis 26 corresponds to frequency, with the negative portion of the scale applicable to the situation where the frequency modulation of the two signals changes phase so that the frequency of one particular signal lags the other. FIG. 2 represents the frequency of the difference signals provided by the signals represented in FIG. 1 with the delay 22, and consequently the frequency difference 20, reduced substantially from the value illustrated in FIG. 1.

According to FIG. 2, curve 28 represents a difference signal produced with a fixed delay of approximately 300 nanoseconds. Curve 30 shows a similar response when the delay is fixed at approximately 200 nanoseconds. The frequency of the difference signal is related to the fixed delay according to the formula:

$$F = \frac{2 \cdot L \cdot \Delta F}{\Delta T \cdot C}$$

where
F is the frequency difference,
L is the delay line length,
$\Delta F$ and $\Delta T$ define the slope of the modulation waveform, with $\Delta F$ being the peak-to-peak frequency deviation and $\Delta T$ being the period of the modulation waveform,
C is the speed of light, and
L/C is the delay time.

It is noted that the frequency difference is dependent upon the delay time and the slope of the modulation waveform., the latter being determined by the modulation frequency and deviation.

The slopes of the curves 28 and 30 in the regions where they cross the zero frequency value, such as region 32, is caused by the transition from leading to lagging, or vise-versa, of the two signals. Such a transition region is illustrated in FIG. 1 as region 34. The curve slopes are exaggerated in FIG. 2 for clarity. With delays of 200 or 300 nanoseconds and a modulating frequency of 100 hertz, the curves 28 and 30 would closely resemble typical square waves.

Figure 3:
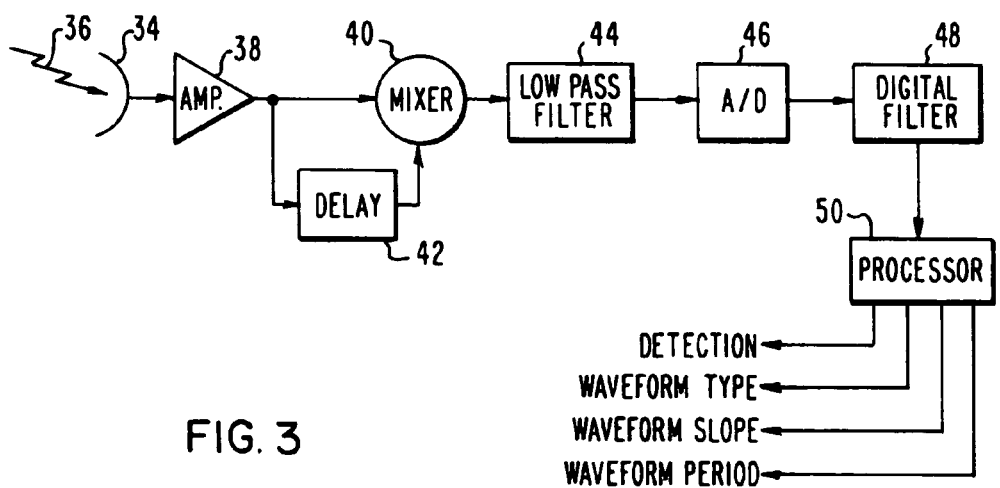
FIG. 3 is a block diagram of an altimeter detector constructed according to this invention.

FIG. 3 is a block diagram of an altimeter detector constructed according to this invention. Antenna 34 picks up the FM-CW signal 36 originating from the distant airborne radio altimeter and applies the captured or received signals to a low noise amplifier 38 which may include some bandpass filtering. Once amplified, the signal is applied to the mixer 40 directly and through the delay circuit 42. The delay circuit 42 may consist of an RF delay line, a digital RF memory, or other similar devices or processes to delay the propagation of the signal applied thereto.

The mixer 40 takes the applied direct and delayed signals and outputs their sum and difference. Low pass filter 44 filters out the sum and passes the difference signal since the difference signal has a relatively low frequency. Under usual circumstances, an upper cutoff frequency of 20 kilohertz or below would be used. Analog-to-digital converter 46 changes the analog difference or intermediate frequency (IF) signal to digital values which are then conditioned by the digital filter 48 which may use fast Fourier transform (FFT) techniques.

The filter 48 effectively analyzes the digital input signal to determine the content of the spectrum containing the signal. Since the difference signal provided by the mixer 40 will usually be in the audio frequency range, digital filter 48 functions much like an audio frequency spectrum analyzer, with the ability to determine the overall frequency content of the signal at any given instant. This information is processed by the processor 50 to make a determination about the source of the received signal, that is, the identity of the aircraft containing the detected altimeter.

The amount of delay is preferably selected to give a difference signal of 20 kilohertz or less, thereby allowing further processing to be performed at audio frequencies. Usually, this requires that the delay be only a small percentage of the period of the IF signal and many times the period of the RF signal. One percent or less of the period of the IF signal is a typical value and an upper limit for time delay of 1000 nanoseconds is preferred. Values as high as 40 kilohertz could also be used if suitable filter cutoff frequency limits are employed.

Processor 50 analyzes characteristics of the received difference signal to make a determination of whether the source is a radio altimeter. The processor first makes a determination that a signal is being received or detected in sufficient strength to be a possible signal from a radio altimeter. Along with this detection of the presence of a signal, the processor also determines the waveform type, slope, and period. By using these parameters, the received signal can be compared to known patterns or standards for deciding if the received signal is from a radio altimeter. In addition, various other information about the detection can be deduced by the processor by such comparisons, such as identification as to friend or foe and type of aircraft from which the signal is emanating.

The signal 36 is of a relatively high frequency and by the unique auto correlation process provided by circuit 42, mixer 40, and low pass filter 44, a relatively low frequency audio range IF signal is obtained. This is accomplished even though the exact carrier frequency of the input signal is not known or needed. Conventional mixing circuits could produce a low IF signal if the carrier frequency was known and the local oscillator frequency was adjusted accordingly. However, when the auto correlation system disclosed herein is used to mix FM-CW signals, a fixed low frequency difference signal is obtained regardless of the location or value of the carrier frequency.

The low frequency difference signal, obtained independently of the carrier frequency of an FM-CW signal, has the advantage of being easier to filter and process than either a fixed higher frequency or variable frequency IF signal. Because the bandwidth of the low frequency IF signal is small, narrow filtering with its inherent signal-to-noise ratio benefits can be used. In appreciating the limited bandwidth requirements, it should be pointed out that the negative frequency portions of the curves 28 and 30 shown in FIG. 2 can be regarded as positive frequencies since the frequencies are the same for filter response. Only the phase of the plus and minus frequencies are different. Thus, for example, a filter selected to pass +5 kilohertz would also pass −5 kilohertz just as easily.

Although the disclosed invention is applicable only to frequency modulated CW signals, the waveform of the modulation is not critical. Instead of triangular modulation as shown in FIG. 1, sinusoidal or saw-tooth modulation may be effectively detected by the circuit of FIG. 3, thus allowing the detector to work well with about all of the known operational radio altimeters.

Calculations based on measured data have shown that for conservative system parameters, such as receiver antenna gain of 20 db, noise figure of 7 db, RF bandwidth of 200 megahertz, transmitter power of 250 milliwatts, altimeter antenna gain of −10 dbi, carrier frequency of 4 gigahertz, and a signal-to-noise ratio of 15 db, the expected operating range for the detector disclosed herein is 44 kilometers. This represents an improvement over current altimeter detectors and still allows for observations and determinations based upon the waveform characteristics of the received signals.

It is emphasized that since numerous changes may be made in the above-described system and since different embodiments of the invention may be made without departing from the spirit thereof, it is intended that all of the matter contained in the foregoing description or shown in the accompanying drawing shall be interpreted as illustrative rather than limiting.

I claim:

1. An FM-CW altimeter detector suitable for detecting the presence of frequency modulated signals from an altimeter, said detector comprising:
    means for capturing a high frequency FM-CW signal originating from a distant source;
    means for delaying the captured signal;
    means for mixing the captured signal with the delayed signal;
    means for passing the difference signal and rejecting the sum signal from said mixer;
    means for analyzing the frequency spectrum of the difference signal; and
    means for processing the analyzed information from the frequency spectrum to determine if the signal originated from an altimeter device.

2. The detector of claim 1 wherein the delay means provides a delay which is sufficient to produce a difference frequency of less than 20 kilohertz.

3. The detector of claim 1 wherein the delay means provides a delay which is less than 1000 nanoseconds.

4. The detector of claim 1 wherein the delay means provides a time delay which is not more than one percent of the period of the difference signal.

5. The detector of claim 4 wherein the time delay is substantially longer than the period of the carrier frequency of the captured FM-CW signal.

6. The detector of claim 1 wherein the means for passing the difference signal and rejecting the sum signal comprises a low pass filter.

7. The detector of claim 6 wherein the cutoff frequency of the low pass filter is below 20 kilohertz.

8. The detector of claim 1 wherein the means for analyzing the frequency spectrum of the difference signal comprises a fast Fourier transform processor.

9. The detector of claim 1 wherein the means for processing the analyzed information reacts to the presence of signals from the analyzing means and the waveform type, slope, and period of said signals.

10. An FM-CW altimeter detector suitable for detecting the presence of frequency modulated signals from an altimeter, said detector comprising:
    an antenna for receiving the frequency modulated signals from the altimeter;
    an amplifier for increasing the amplitude of the received signals;
    a delay circuit for delaying the amplified signals;
    a mixer circuit to which the delayed and non-delayed amplified signals are applied;
    a low pass filter which passes the difference signals from said mixer circuit;
    an analog-to-digital converter which converts the analog difference signals to digital values;
    means for filtering the converted digital signals and detecting information about the frequency content of the signals; and processing means for comparing the detected frequency content information with stored information, said processing means indicating the reception of an altimeter signal when the detected information suitably corresponds to the stored information.

11. The detector of claim 10 wherein the delay circuit delays the amplified signals an amount of time which is substantially longer than the period of the carrier frequency of the frequency modulated altimeter signal, which is shorter than one percent of the period of the difference signal, and which is less than an amount needed to provide a mixer difference signal of 40 kilohertz.

12. The detector of claim 10 wherein the filtering means comprises a fast Fourier transform processor.

13. The detector of claim 10 wherein the processing means reacts to information about the presence of signals and to the waveform type, slope, and period of the signals.

14. The detector of claim 13 wherein the processing means additionally compares the signal information to stored information for the purpose of identifying the type of airborne craft transporting the altimeter.

\* \* \* \* \*